United States Patent
Davis et al.

(10) Patent No.: US 7,255,001 B1
(45) Date of Patent: Aug. 14, 2007

(54) THERMAL FLUID FLOW SENSOR AND METHOD OF FORMING SAME TECHNICAL FIELD

(75) Inventors: Richard A. Davis, Plano, TX (US); Aravind Padmanabhan, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/493,261

(22) Filed: Jul. 25, 2006

(51) Int. Cl.
*G01F 1/68* (2006.01)
(52) U.S. Cl. .................................. 73/204.26
(58) Field of Classification Search ............ 73/204.26, 73/204.23, 204.24, 204.22
See application file for complete search history.

(56) References Cited

U.S. PATENT DOCUMENTS

| | | | |
|---|---|---|---|
| 4,343,768 A * | 8/1982 | Kimura | 422/97 |
| 4,909,078 A * | 3/1990 | Sittler et al. | 73/204.26 |
| 5,050,429 A | 9/1991 | Nishimoto et al. | 73/204.26 |
| 6,666,082 B2 * | 12/2003 | Watanabe et al. | 73/204.22 |
| 6,794,981 B2 | 9/2004 | Padmanabhan et al. | 338/25 |
| 6,862,930 B1 * | 3/2005 | Kohno et al. | 73/204.26 |

* cited by examiner

*Primary Examiner*—Jewel Thompson
(74) *Attorney, Agent, or Firm*—Matthew F. Lambrinos; Kermit D. Lopez; Luis M. Ortiz (57) ABSTRACT

A thermal fluid flow sensor and method of forming same. The flow sensor has an integrated circuit substrate, such as a silicon substrate, and a region of low thermal conductivity material carried on the top surface of the integrated circuit substrate. One or more pairs of temperature sensing elements are disposed on the low thermal conductivity region together with a heating element so that a robust flow sensor can be provided at low cost. Signal conditioning circuitry is disposed on the same surface as the temperature sensing elements and connected to the sensing elements thereby further reducing costs and improving the flow sensor sensitivity.

13 Claims, 5 Drawing Sheets

THERMAL FLUID FLOW SENSOR AND METHOD OF FORMING SAME TECHNICAL FIELD

TECHNICAL FIELD

Embodiments are generally related to sensors, and in particular, to fluid flow sensors for sensing fluid properties, such as temperature, mass flow rate, temperature, thermal conductivity and specific heat. Embodiments are additionally related to thermal fluid flow sensors in the form of MEMS devices and methods of manufacturing such thermal fluid flow sensors. Embodiments are also related to low cost micro fluid flow sensor dies.

BACKGROUND OF THE INVENTION

Fluid flow sensors in the form of MEMS devices are configured to measure properties of fluid in contact with the sensors and provide output signals representative of the fluid flow rates. Thermal fluid flow sensors are configured to heat the fluid and measure the resulting thermal properties of the fluids to determine flow rates. Such thermal flow sensors generally include a microsensor die consisting of a substrate and one or more elements disposed on the substrate for heating the fluid and sensing the fluid thermal properties.

A microbridge liquid flow sensor, for example as detailed in U.S. Pat. No. 4,651,564 to Johnson et al., is an example of such a thermal flow sensor. The microbridge sensor includes a flow sensor chip which has a thin film bridge structure thermally insulated from the chip substrate. A pair of temperature sensing resistive elements are arranged on the upper surface of the bridge either side of a heater element such that, when the bridge is immersed in the liquid stream, the flow of the liquid cools the temperature sensing element on the upstream side and promotes heat conduction from the heater element to thereby heat the temperature sensing element on the downstream side. The temperature differential between the upstream and downstream sensing elements, which increases with increasing flow speed, is converted into an output voltage by incorporating the sensing elements in a Wheatstone bridge circuit such that the flow speed of the gas or liquid can be detected by correlating the output voltage with the flow speed. When there is no liquid flow, there is no temperature differential because the upstream and downstream sensing elements are at similar temperatures.

However, a major drawback of microbridge liquid sensors is that the performance of the sensors is limited when operating in harsh environments or in high mass or high flow rate conditions. In such conditions, particulates of the flowing gas or liquid being measured are easily deposited in the underlying structure of the microbridge causing uncontrolled thermal changes and even damage to the sensor so that the reliability and operating life time of the sensors can be adversely affected.

Another example of a thermal sensor is a microstructure thermal flow sensor having a microsensor die with a Microbrick® or microfill structure which sensor is more suited to measuring fluid flow and properties under harsh environmental conditions. Note Microbrick® is a registered trade mark of Honeywell Inc. of Morristown, N.J. The microstructure flow sensor uses a Microbrick® which consists of a solid quartz substrate beneath the heating/sensing elements and has a passivation layer isolating the heating/sensing elements from the fluid so that the sensor is less susceptible to the effects of the fluid. Although this type of microstructure sensor is capable of reliable and rapid-response operation under harsh environments making it a versatile fluid flow sensor for a variety of applications, this type of sensor is expensive to make and integrate into existing sensor applications.

The aforementioned problems demonstrate that there is a need to provide a robust low cost fluid flow sensor which can be easily integrated into existing sensor applications.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect to provide for an improved fluid flow sensor.

It is another aspect, to provide for a low cost and robust thermal fluid flow sensor.

It is another aspect to provide for a method of forming an improved thermal fluid flow sensor.

The aforementioned aspects of the invention and other objectives and advantages can now be achieved as described herein.

According to one aspect, a fluid flow sensor has an integrated circuit substrate having a surface thereof and a region of low thermal conductivity material which is carried on the integrated circuit substrate at the surface. One or more sensing elements are disposed on at least the low thermal conductivity material for sensing a property of a fluid. Signal conditioning circuitry is also disposed on the integrated circuit surface adjacent the sensing element(s). The sensing element(s) and signal conditioning circuitry are electrically interconnected.

Advantageously, by interconnecting the element(s) directly to signal conditioning circuitry disposed on the same integrated circuit substrate surface as the sensing element(s), the path resistance between the sensing elements and signal conditioning circuitry is significantly reduced in comparison to flow sensors in which the signal conditioning circuitry is located remote from the sensor substrate. A decrease in the sensor path resistance between the signal conditioning circuitry and the sensing elements increases the sensor signal to noise ratio which improves the sensor performance, especially for low current or low fluid flow measurements.

Also, by disposing sensing elements on a low thermal conductivity region which is included on an integrated circuit substrate, a more structurally robust fluid flow sensor can be implemented by means of semiconductor and integrated circuit fabrication techniques apparent to those skilled in the art. Preferably, the integrated circuit substrate can comprise silicon, such as n or p type silicon so that the sensor can be manufactured using low cost micromachining processes.

The signal conditioning circuitry and said sensing element(s) can be interconnected by conductive interconnects deposited on the surface between the sensing element(s) and the signal conditioning circuitry. The signal conditioning circuitry can comprise one or more integrated circuit elements, such as one or more thin film transistors, diodes, resistors.

The low thermal conductivity material, which can be for example a dielectric material such as silicon dioxide, can be deposited in a trench formed in the integrated circuit substrate. The depth of the trench can be shorter than the distance between a bottom of the trench and another surface of the integrated circuit substrate opposite the surface from which the trench extends.

The flow sensor can include through the wafer (TTW) vias formed in the integrated circuit substrate for passing signals between the conditioning circuitry and external circuitry.

According to another aspect, a thermal fluid flow sensor comprises a silicon integrated circuit substrate having a top surface thereof and a region of low thermal conductivity material carried on the silicon integrated circuit substrate at the top surface. One or more pairs of temperature sensing elements are disposed on at least the low thermal conductivity region. A heating element is also disposed on the low thermal conductivity region between the temperature sensing elements. Signal conditioning circuitry is disposed on the silicon substrate top surface adjacent the temperature sensing/heating elements. The signal conditioning circuitry and temperature sensing elements are electrically interconnected.

By interconnecting the temperature sensing elements directly to signal conditioning circuitry disposed on the substrate top surface, the path resistance between the temperature sensing elements and signal conditioning circuitry is significantly reduced in comparison to known flow sensors in which the signal conditioning circuitry is located remote from the sensor substrate. A decrease in the sensor path resistance between the signal conditioning circuitry and the temperature sensing elements increases the sensor signal to noise ratio which improves the sensor performance, especially for low current measurements. Also, disposing the temperature sensing heating elements on a low thermal conductivity region which is included on a silicon integrated circuit substrate in advantageous in that a more structurally robust fluid flow sensor can be mass produced by means of low cost silicon wafer level processing techniques thereby providing a low cost robust flow sensor.

The signal conditioning circuitry can comprise one or more integrated circuit elements, such as a thin film transistors, diodes and/or resistors, which can also be manufactured at low cost by means of known wafer level processing techniques further reducing the sensor manufacturing cost.

The low thermal conductivity material, which can be for example silicon dioxide or oxide, can be deposited in a trench formed in the silicon integrated circuit substrate. The depth of the trench can be shorter than the distance between a bottom of the trench and a bottom surface of the integrated circuit substrate. For example, for a substrate thickness of about 300-500 µm, the trench depth can be about 5-50 µm.

The signal conditioning circuitry and the temperature sensing elements can be interconnected by conductive interconnects deposited on the surface between the temperature sensing elements and the signal conditioning circuitry.

The flow sensor can include through the wafer (TTW) vias formed in the silicon integrated circuit substrate for passing signals between the signal conditioning circuitry and external circuitry and optionally between the heating element and the external circuitry.

According to another aspect, a method of manufacturing a thermal fluid flow sensor comprises providing an integrated circuit substrate having a surface thereof, forming a region of low thermal conductivity material at the surface, forming at least one pair of temperature sensing elements on at least said low thermal conductivity material region, forming a heating element on at least said low thermal conductivity material region between the at least one pair of temperature sensing elements, forming signal conditioning circuitry on the integrated circuit surface adjacent the temperature sensing and heating elements, and electrically interconnecting the signal conditioning circuitry and the temperature sensing elements.

The integrated circuit substrate can comprise a silicon integrated circuit substrate. The signal conditioning circuitry can comprise integrated circuit elements such as diodes, transistors and resistors.

The method step of forming a low thermal conductivity material region on the surface of the integrated circuit substrate can comprise etching a trench in the integrated circuit substrate; and depositing the low thermal conductivity material in the trench.

The trench depth can be shorter than the distance between a bottom of the trench and another surface of the integrated circuit substrate surface opposite the surface from which the trench extends. The step of interconnecting the signal conditioning circuitry and the temperature sensing elements can comprise depositing conductive interconnects on the surface extending between the signal conditioning circuitry and the sensing temperature elements.

The method can further comprise forming through the wafer (TTW) vias in the integrated circuit substrate, and interconnecting the TTW vias and the signal conditioning circuitry at the surface. The substrate can have a thickness of about 300-500 µm and the trench depth can be about 5-50 µm. The low thermal conductivity material can comprise a dielectric material of low thermal conductivity such as silicon dioxide or oxide.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
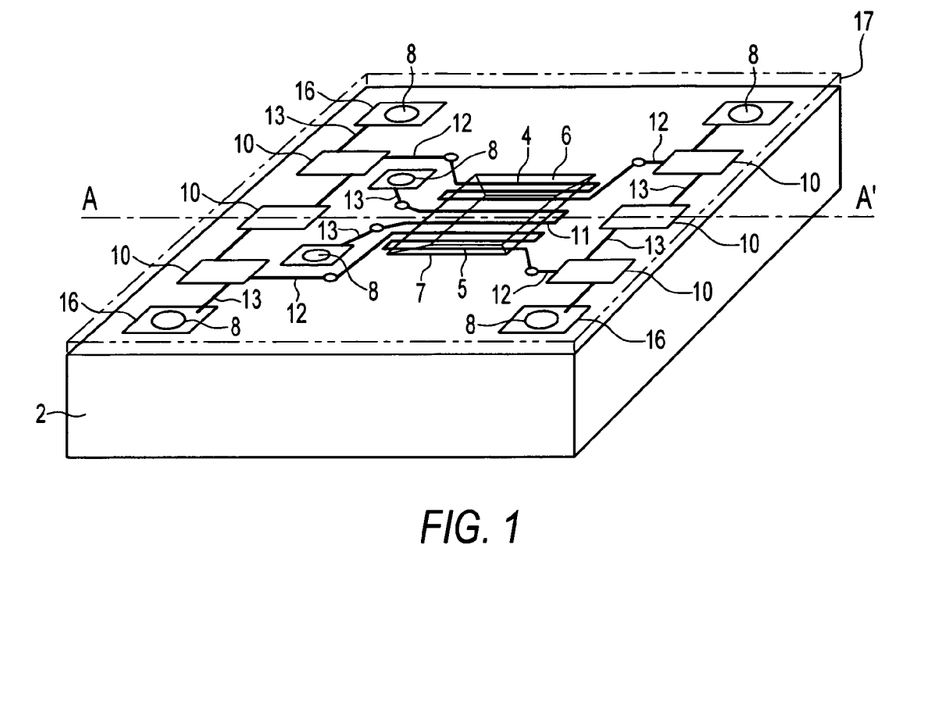
FIG. 1 illustrates a perspective view taken from above a thermal fluid flow sensor according to a preferred embodiment.
Figure 2:
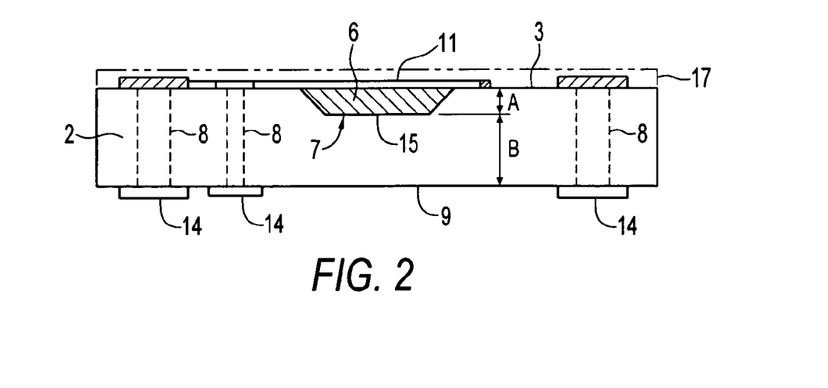
FIG. 2 illustrates a cross-sectional view taken along line A-A' of FIG. 1.
Figure 3:
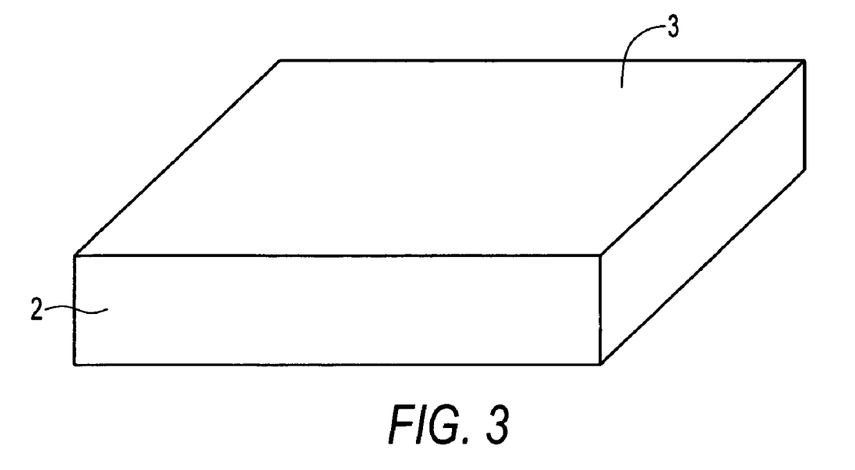
FIGS. 3-9 illustrate perspective views of the flow sensor of FIG. 1 at various stages of manufacture.

Referring the accompanying drawings, FIG. 1 illustrates a perspective view taken from above the fluid flow sensor according to one embodiment and FIG. 2 illustrates a partial cross-sectional view taken along line A-A' of FIG. 1. The fluid flow sensor according to one embodiment generally consists of a thermal liquid flow sensor 1 comprising an integrated circuit substrate 2 having a surface 3 which, in the illustrative embodiment, is top surface 3, and a region of low thermal conductivity material 6 carried on the integrated circuit substrate at surface 3. The sensor 1 has at least one pair of temperature downstream/upstream sensing elements 4, 5 disposed on the low thermal conductivity region 6, an optional heating element 11, also disposed on at least the low thermal conductivity region 6, between the temperature sensing elements 4, 5, and signal conditioning circuitry 10 disposed on the first surface 3 adjacent the temperature sensing and heating elements 4,5,11. The signal conditioning circuitry 10 and temperature sensing elements 4, 5 are electrically interconnected together such that the signal conditioning circuitry can process and/or control signals transmitted between the sensing elements and the signal conditioning circuitry to thereby provide a sensor output. For reasons explained in more detail below, the thermal liquid flow sensor 1 exhibits improved performance, especially for low fluid flow measurements, and can be manufactured at low cost.

In the illustrative embodiment of the sensor of FIG. 1, the signal conditioning circuitry 10 is fabricated as interconnected integrated circuit elements 10, such as thin film transistors, resistors and operational amplifiers, which are located on the top surface 3 on either side of the low thermal conductivity region 6, and which are interconnected by means of conductive tracks of links 13. Signal conditioning circuitry 10 and the temperature sensing 4, 5 are interconnected by conductive links or tracks 12 also deposited on the top surface 3. Interconnects 12, 13 may be formed from metal or other conductive material and are preferably formed from layers of TiW and Au in order to ensure the interconnects have good corrosion resistance. It should also be noted that the integrated circuit elements 10 and the interconnects 12 and 13 are illustrated in a conceptual manner in the accompanying figures as those skilled in the art would understand.

Advantageously, by interconnecting the temperature sensing elements 4, 5 directly to signal conditioning circuitry 10 disposed on the same surface 3 as the flow sensor elements 4,5,11, the path resistance between the temperature sensing elements 4, 5 and signal conditioning circuitry 10 is significantly reduced in comparison to known flow sensors in which the signal conditioning circuitry is located remote from the sensor substrate. A decrease in the sensor path resistance between the signal conditioning circuitry and the temperature sensing and heater elements increases the sensor signal to noise ratio which improves the sensor performance, especially for low current or low fluid flow measurements.

Heating/sensing elements 4,5,11, which in the illustrative embodiment of the sensor of FIG. 1 are in the form of resistive elements have grid structures fabricated from a suitable metal, such as platinum or a permalloy, are supported on the low thermal conductivity material region 6, which is preferably silicon dioxide but may be borosilicate glass, fused silica, fused quartz or other glassy or dielectric materials. Chrome silicon (CrSi) or doped silicon thin film resistors or other types of silicon-based resistors can be employed as elements 4,5,11 instead of metal elements. In order to sense high mass flux flow rates, it is also advantageous to have a substantially solid region 6 with a low thermal conductivity beneath the temperature and sensing elements 6,7,11. If thermal conductivity is too low, the output signal saturates at moderate fluxes (1 g/cm<2>s); but if it is too high the output signal becomes too small. The low thermal conductivity region 6 is chosen to have better thermal isolation characteristics than silicon, thus increasing the sensing capabilities of the sensor. The use of glass also allows for a more robust physical structure to be used.

Advantageously, by disposing the temperature sensing and heating elements 4,5,11 on a low thermal conductivity region 6 which is included on an integrated circuit substrate, a more structurally robust liquid flow sensor can be implemented by means of semiconductor and integrated circuit fabrication techniques apparent to those skilled in the art. As will be explained in more detail below, the integrated circuit substrate 2 can be fabricated from silicon and mass produced by means of wafer level processing techniques and subsequently singulated, that is, separated from adjacent packages, using known wafer dicing methods, and thereby enable the sensor to be manufactured at low cost.

As best shown in FIG. 2, the low conductivity region 6 is carried in a shallow trench or cavity 7 which extends from the top surface 3 into the substrate to a depth A which is typically, but not necessarily, less than the distance B between the trench bottom 15 and the bottom surface 9 of the substrate 2. In the illustrative embodiment of FIG. 1, for a substrate thickness of about 300-500 µm, the trench depth is about 5-50 µm. However, other substrate thicknesses and trench depths may be adopted. Shallow trenches are advantageous in that they are easier to fabricate and enable manufacturing costs to be kept to a minimum.

The conductive vias 8 are formed through the substrate 2 between the top and bottom surfaces 3,9 to form through the wafer (TTW) vias 8 for transmitting signals between the signal conditioning circuitry 10 and external circuitry (not shown) and additionally between the heating element 11 and the external circuitry. Conductive links or tracks 13 interconnect the signal conditioning circuitry 10/heating element 11 to respective contact top conductive pads 16 which terminate the upper ends of the TTW vias 8. Bonding pads 14 disposed on the bottom surface 9 for solder bonding or other types of conductive bonding to external circuitry terminate the lower ends of the TTW vias 8. A protective layer 17 (shown in dotted line in FIGS. 1 & 2), such as a silicon nitride layer SiNx, is disposed on the top of the flow sensor substrate covering and protecting the signal conditioning circuitry 10, flow sensor elements 4,5,11 and conductive interconnects 12,13.

In an alternative embodiment (not shown), the flow sensor is identical to the flow sensor 1 of the embodiment shown in FIG. 1 with the exception that the TTW vias 8 are omitted and openings are formed in the protective layer above the top conductive pads 16 to enable wires for passing signals between the signal conditioning circuitry/flow sensor elements and external circuitry to be wire bonded to the open pads.

A method of fabricating a liquid flow sensor according to one embodiment which is suitable for fabricating a thermal liquid flow sensor shown in FIG. 1 will now be described with reference to FIGS. 3-9, which illustrate perspective views of the sensor at various stages of production. As a general overview, initially an integrated circuit substrate 2 is provided which is processed to include or carry a region of low conductivity material 6. Thereafter, at least one pair of temperature sensing elements 4, 5 and a heating element 11 are deposited on the region 6 with the heating element arranged between the temperature sensing elements. Including a low thermal conductivity region 6 on an integrated circuit substrate 2 is advantageous in that a more structurally robust liquid flow sensor can be implemented by means of semiconductor and integrated circuit fabrication techniques apparent to those skilled in the art. Signal conditioning circuitry 10 is formed on the top surface 3 of the integrated circuit substrate 2 adjacent the temperature sensing and heating elements 4,5,11. Interconnects 12 are deposited on the top surface 3 electrically interconnecting the signal conditioning circuitry 10 and the temperature sensing elements 4, 5.

Advantageously, by disposing signal conditioning circuitry 10 on the same substrate surface as the temperature sensing elements 4,5 and forming interconnects also on the same surface to interconnect temperature sensing elements 4,5 directly to signal conditioning circuitry 10, the path resistance between the temperature sensing elements 4,5 and signal conditioning circuitry 10 is significantly reduced in comparison to known flow sensors in which the signal conditioning circuitry is located remote from the sensor substrate. The method provides as thermal flow sensor having increased sensor signal to noise ratio which improves the sensor performance, especially for low current measurements.

Referring now in more detail to the illustrative embodiment of the method depicted in FIGS. 3-9, a plurality of individual die or integrated circuit silicon substrates are defined using typical photolithography techniques (not shown) so that there are multiple copies of the integrated circuit silicon substrate. One such integrated circuit substrate 2 is shown in perspective view in FIG. 3 which is derived from a standard [100] silicon wafer doped either N or P type and having a typical thickness of 300-500 microns. The substrates 2 can be derived from semiconductor wafers other than silicon. However, fabricating the flow sensors 1 using silicon as the starting material greatly reduces the cost of manufacture because the sensor can be mass produced by means of low cost wafer level processing techniques and subsequently singulated, that is, separated from adjacent packages, using known wafer dicing methods, to thereby provide a low cost flow sensor. Silicon is also most advantageous for creating the circuit elements 10 previously described.

Figure 4:
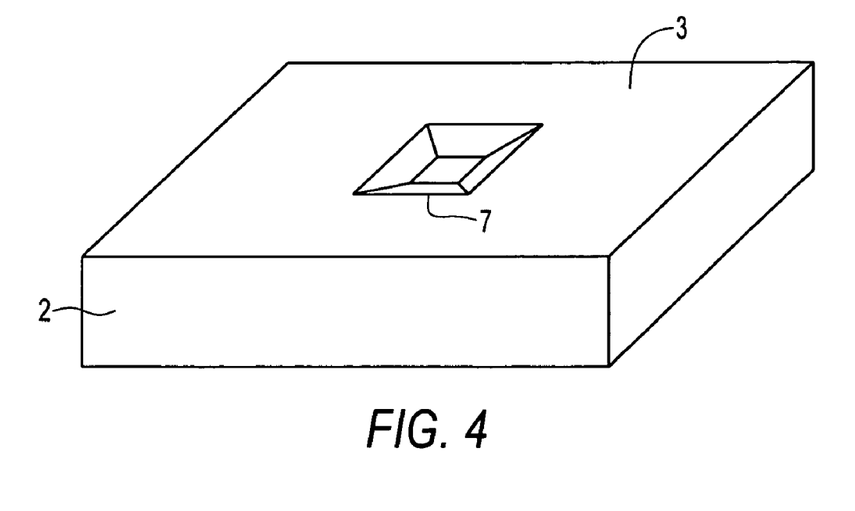
Figure 5:
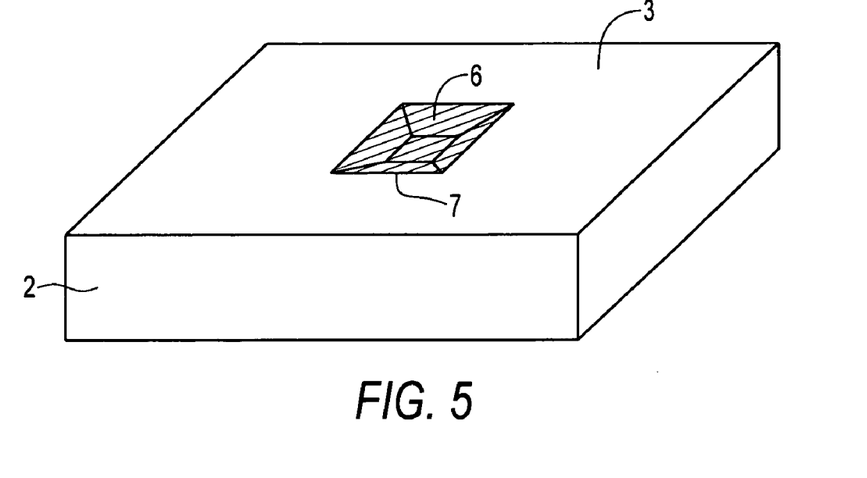

For each such integrated circuit substrate 2, a shallow trench 7 is etched in the silicon substrate 2 by wet micromachining techniques using KOH or other alkali solutions as is known in the art (see FIG. 4). Alternatively the trench can be etched with a dry plasma technique. Trench 7 is etched to a depth A from the top surface 3 which is typically, but not necessarily, shorter than the distance B between the trench bottom 15 and the substrate bottom surface 9 (see FIG. 2). In the illustrative embodiment, the trench depth is about 5-50 microns in comparison to the substrate thickness of about 300-500 microns. Thereafter, the trench is filled with a low conductivity material, such as silicon oxide or another dielectric material as shown in FIG. 5. Alternatively, the trench could be filled with borosilicate glass, fused silica, fused quartz or other glassy materials.

Figure 6:
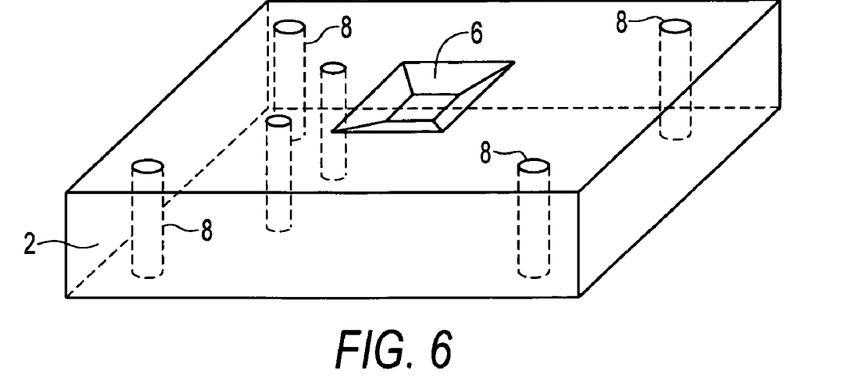

Through-the-wafer (TTW) via through holes 8 are also patterned and etched in substrate (see FIG. 6). Small holes or vias are etched completely through the wafer by means of a plasma etch process known in the art. An insulating oxide is then grown on the sidewalls of the vias and then the vias 8 are filled with an electrically conductive material. The via fill material should preferably be heavily doped polysilicon if TTW vias are to be adopted.

Thereafter, the top and bottom surfaces 3, 9 of the substrate are then polished or planarized so that the wafer can be processed in a manner that is typical to semiconductor processing.

Figure 7:
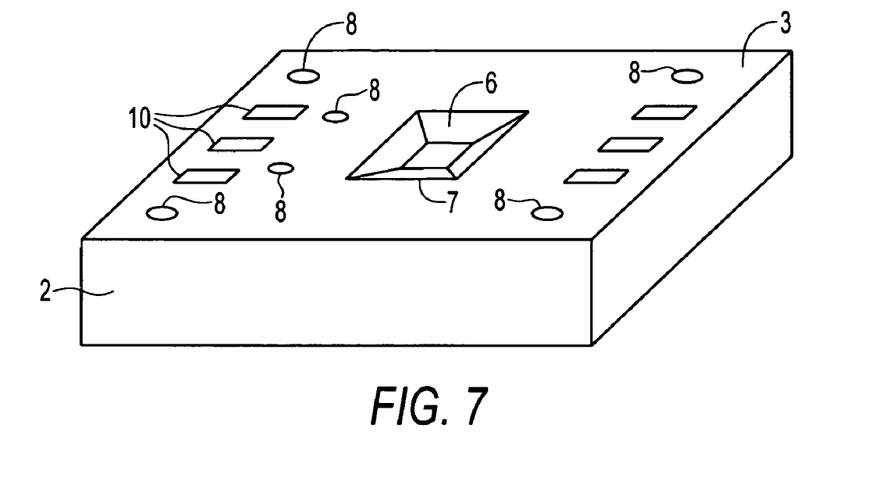

Signal conditioning circuitry 10 is then fabricated on the substrate top surface 3, in close proximity to the low thermal conductivity region 6, by forming integrated circuit elements 10, such as transistors, resistors and diodes, using a variety of oxidations, doping, and diffusion processes know in the art as indicated in FIG. 7.

Figure 8:
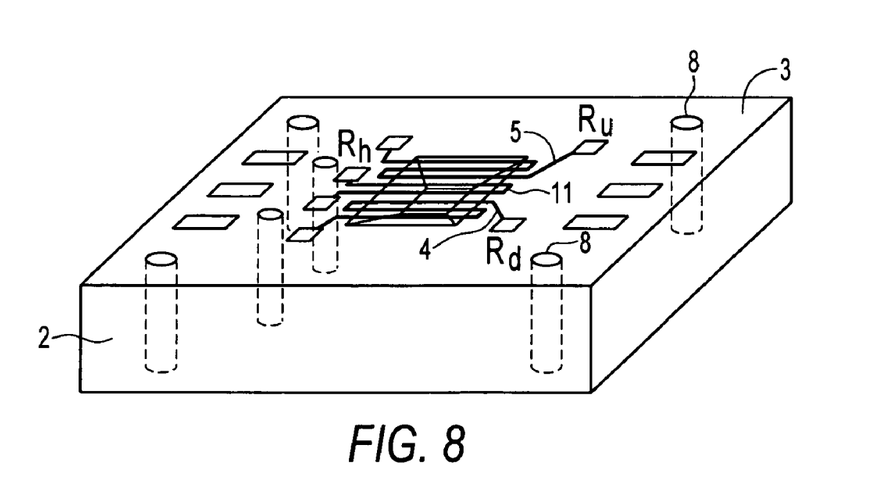

Thereafter, temperature sensing elements 4, 5 and heating element 11 are deposited on the thermal conductivity region 6 as indicated in FIG. 8. Typically, the sensing and heating elements 4, 5, 11 are fabricated by depositing films of platinum by known metal deposition techniques, such as physical vapor deposition or sputtering. Alternatively, the elements can be formed from a permalloy (Ni and Fe). Chrome silicon (CrSi) or doped silicon thin film resistors or other types of silicon-based resistors can be employed as elements 4,5,11 instead of metal elements.

Following formation of the sensing and heating elements, the flow sensing elements 4,5 are eclectically connected to integrated circuit elements 10 (transistors, etc) using metal interconnects 12. The individual integrated circuit elements 10 are interconnected using metal interconnects 13 (see FIG. 1). Additional metal interconnects 13 are formed on the substrate top surface 3 to interconnect the top ends of the TTW vias 8 and integrated circuit elements 10/heating element 11. Metal interconnects 12, 13 preferably are formed as films of TiW and Au because of their good corrosion resistance. However, other types of metals such as Aluminum or other types of conductive interconnects can be employed instead of TiW and Au. The interconnects are deposited using metal deposition techniques known in the art.

Figure 9:
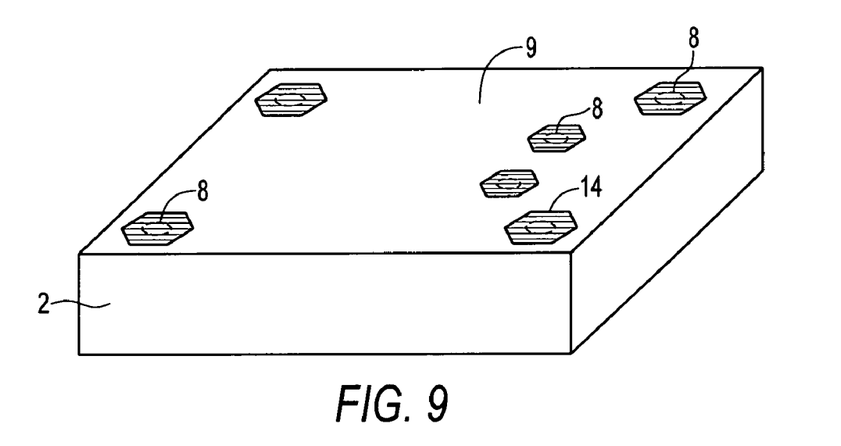

As indicated in FIG. 9, which illustrates a perspective view of the substrate bottom, metal contacts and pads 14 (such as gold) are patterned on the bottom surface 9 of the wafer, in contact with the bottom ends of the TTW vias 8, for solder connection or other type of electrical connection to external circuitry.

Preferably, a protective layer 17, such as SiNx or other suitable insulating or dielectric layer, is deposited on the substrate 2 so as to encapsulate the sensing and heating elements 4,5,11 and, if necessary, the signal conditioning circuitry and interconnects (see FIG. 1). The SiNx layer is advantageous in that it minimizes the diffusion of moisture to the sensing and heating elements. The SiNx layer 17 can be deposited by chemical vapor deposition (CV), low pressure chemical vapor deposition (LPCVD), plasma enhanced chemical vapor deposition (PECVD), sputtering or other known techniques. The required SiNx layer thickness can be for example of the order of 8000 Å.

Finally, the entire wafer is diced or sawn into individual die or chips which are subsequently packaged in a manner known in the art.

In an alternative embodiment, the method is the same as the method of the illustrative embodiment indicated in FIGS. 3-9 with the exception that the method steps forming the TTW vias and bottom bonding pads are omitted and, preparatory to the step of covering the substrate with a SiNx layer 17 or other type of protective layer, conductive bonding pads are formed on the top surface of the substrate. Following protective layer deposition, portions of the protective layer 17 covering the interconnecting conductive bonding pads are etched back so as to open the pads. Etching back of the protective layer can be performed by patterning a photoresist applied to the substrate 2 and subsequently plasma etching the exposed SiNx back to the bonding pads. The photoresist can then be removed via plasma and wet positive resist strip as is known in the art. Wire leads are then wire bonded to the exposed conductive contact pads by reflowing the solder pads using known solder reflow techniques. Conductive bonding other than wire bonding can be used. The resulting assembly is then packaged as required.

The signal conditioning and flow sensor elements can then be electrically connected to external circuitry by means of the wire bonding.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

For example, in the illustrative embodiments, the fluid flow sensors have pairs of temperature sensing elements and a heater, however, the fluid flow sensors can have any number of temperature sensing elements and/or heaters and in some cases may not need a heating element at all Furthermore, those skilled in the art would understand that the fluid flow sensor can be any type of fluid flow sensor which has at least one sensing element disposed thereon capable of sensing a flow property of the fluid. Those skilled in the art would also understand that the heating element could also be electrically connected to integrated circuits or other circuitry disposed on the substrate instead of being directly connected to the vias or pads.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows.

Having thus described the invention what is claimed is:

1. A sensor for sensing fluid flow, said sensor comprising
   a semiconductor integrated circuit substrate having a surface thereof;
   a region of low thermal conductivity material carried on said semiconductor integrated circuit substrate at said surface;
   at least one sensing element disposed on said region of low conductivity material for sensing a property of a fluid; said region of low conductivity interposing said at least one sensing element and said semiconductor integrated circuit substrate; and
   signal conditioning circuitry disposed on said surface, adjacent said sensing element(s), said sensing element(s) and said signal conditioning circuitry being electrically interconnected.

2. The sensor of claim 1, wherein said semiconductor integrated circuit substrate comprises silicon.

3. The sensor of claim 1, wherein said signal conditioning circuitry comprises at least one integrated circuit element.

4. The sensor of claim 1, wherein said low thermal conductivity material is deposited in a trench formed in said semiconductor integrated circuit substrate, said trench extending downwardly from said surface of said integrated circuit semiconductor substrate.

5. The sensor of claim 4, wherein the depth of said trench is shorter than the distance between a bottom of said trench and one other semiconductor integrated circuit substrate surface opposite the surface from which said trench extends.

6. The sensor of claim 1, wherein said signal conditioning circuitry and said sensing element(s) are interconnected by conductive interconnects deposited on said surface between said sensing element(s) and said signal conditioning circuitry.

7. The sensor of claim 1, further comprising through the wafer (TTW) vias for passing signals between said signal conditioning circuitry and external circuitry.

8. A thermal fluid flow sensor comprising
   a silicon integrated circuit substrate having a top surface thereof;
   a trench having a sidewall extending downwardly from said top surface towards a bottom of said trench;
   a region of low thermal conductivity material deposited in said trench;
   at least one a pair of temperature sensing elements disposed on at least said low thermal conductivity region on a top surface thereof;
   a heating element disposed between said temperature sensing elements on at least said low thermal conductivity region on said top surface thereof; and
   signal conditioning circuitry disposed on said top surface of said silicon integrated circuit substrate adjacent said temperature sensing/heating elements, said signal conditioning circuitry and said temperature sensing elements being electrically interconnected.

9. The sensor of claim 8, wherein said signal conditioning circuitry comprises at least one integrated circuit element.

10. The sensor of claim 8, wherein said low thermal conductivity material a dielectric or lass material filled in said trench.

11. The sensor of claim 8, where said signal conditioning circuitry and said temperature sensing elements are interconnected by conductive interconnects deposited on said top surface of said semiconductor integrated circuit substrate between said temperature sensing elements and said signal conditioning circuitry.

12. The sensor of claim 11, further comprising through the wafer (TTW) vias formed in said silicon integrated circuit substrate for passing signals between said signal conditioning circuitry and external circuitry and optionally also between said heating element and said external circuitry.

13. The sensor of claim 8, wherein said low thermal conductivity material comprises a silicon oxide or dioxide.

* * * * *